US006601878B2

United States Patent
Ooi et al.

(10) Patent No.: US 6,601,878 B2
(45) Date of Patent: Aug. 5, 2003

(54) CONNECTOR ASSEMBLIES SUITABLE FOR ATTACHMENT TO BENT TUBULAR CONDUIT

(75) Inventors: Shigeo Ooi, Aichi-ken (JP); Yukihiro Hattori, Aichi-ken (JP); Hiroshi Ooizumi, Okazaki (JP); Kazunori Iida, Anjo (JP)

(73) Assignees: Kabushiki Kaisha Togo Seisakucho, Aichi-ken (JP); Mitsubishi Jidosha Kogyo Kabushiki Kaisha, Tokyo (JP); Mitsubishi Jidosha Engineering Kabushiki Kaisha, Kanagawa-ken (JP)

( * ) Notice: Subject to any disclaimer, the term of this patent is extended or adjusted under 35 U.S.C. 154(b) by 0 days.

(21) Appl. No.: 10/125,560

(22) Filed: Apr. 19, 2002

(65) Prior Publication Data

US 2002/0163183 A1 Nov. 7, 2002

(30) Foreign Application Priority Data

Apr. 20, 2001 (JP) ........................ 2001-122999

(51) Int. Cl.[7] ............................ F16L 55/00; F16L 43/00
(52) U.S. Cl. ........................................ 285/93; 285/179
(58) Field of Search .................................. 285/179, 93

(56) References Cited

U.S. PATENT DOCUMENTS 4,946,205 A    8/1990    Washizu

FOREIGN PATENT DOCUMENTS

| JP | 9269088 | 10/1997 |
| JP | 2000507677 | 6/2000 |
| JP | 2000329278 | 11/2000 |
| JP | 2001/193885 | 7/2001 |

*Primary Examiner*—David Bochna
*Assistant Examiner*—G M Collins
(74) *Attorney, Agent, or Firm*—Dennison, Schultz & Dougherty

(57) ABSTRACT

A connector assembly 8 may include a connector 10 having flow channel 11 defined therein. One end of the flow channel may engagingly receive a tubular conduit 1. A checker 30 may be coupled to the connector 10. The connection checker 30 may engagingly receive a bent portion 1b of the tubular conduit 1 and ensure a proper connecting condition between the connector 10 and the tubular conduit 1. The connection checker 30 also may prevent the connector 10 from rotating relative to the tubular conduit 1. A holder 20 may detachably and pivotally couple the connection checker 30 to the connector 10.

40 Claims, 9 Drawing Sheets

CONNECTOR ASSEMBLIES SUITABLE FOR ATTACHMENT TO BENT TUBULAR CONDUIT

BACKGROUND OF THE INVENTION

1. Field of the Invention

The present invention relates to connectors that may be utilized to connect to pipes or tubes, e.g., bent pipes or tubes found within fuel pipeline systems and refrigerant systems of automobiles. The present connectors preferably include a device that will easily enable the operator to determine whether or not the pipe or tube has been properly joined to the connector.

2. Description of Related Art

Japanese Laid-Open Patent Publication No. 9-112776 teaches an elastic metallic wire member that is pivotably coupled to a pipe connector. When a pipe is not properly joined to the pipe connector, the wire member will not properly engage an engaging groove. On the other hand, when the pipe is properly joined to the pipe connector, the wire member will properly engage the engaging groove. Therefore, the operator can recognize from the engaging condition of the wire member as to whether the pipe has been properly joined to the pipe connector.

However, the wire member of Japanese Laid-Open Patent Publication No. 9-112776 only serves to check the engagement of the pipe connector and the pipe. Further, the known wire member is not particularly suited for use with a bent pipe or bent tubular conduit. For example, if the known connector and wire member of Japanese Laid-Open Patent Publication No. 9-112776 are connected to a bent pipe, the bent pipe can rotate relative to the pipe connector.

SUMMARY OF THE INVENTION

Therefore, one object of the present teachings is to provide improved connector assemblies. In one of the aspect of the present teachings, connector assemblies are taught that reliably connect a connector (pipe connector) to a bent pipe (bent tubular conduit). Further, connector assemblies are also taught that optionally may prevent the connector from rotating relative to the bent pipe.

According to another aspect of the present teachings, connector assemblies may include means for detecting the connecting condition between the connector and the bent pipe. The detecting member or detecting means preferably may indicate whether the connector has been properly connected to the bent pipe. In addition, means may be provided for preventing the bent pipe from rotating relative to the connector when the connector engages the bent pipe. However, when the connecting condition is improper, the connector assembly preferably does not properly fit onto the bent pipe. For example, the detecting member and/or the rotation prevention member may be designed so as to only permit the connector to engage the bent pipe only when the connector has been properly positioned with respect to the bent pipe. Therefore, the detecting means and the rotation prevention means may serve to both check the connecting condition and prevent the bent pipe from rotating relative to the connector.

According to another aspect of the present teachings, connector assemblies may include a connection checker that is coupled to the connector. The connection checker may take a variety of forms. For example, the connection checker may be an arm or bent (curved) flange. The connection checker may preferably have the same, or substantially the same, curvature as the bent pipe or bent tubular conduit to which the connector will be attached. That is, the shape of the connection checker may have a complementary shape with the bent pipe. Further, the connection checker may include means for engaging at least a portion of the bent pipe (e.g., the bent portion of the bent pipe). In one representative example, the connection checker may include a slot or opening (female element) designed to receive the bent pipe. In addition, an elastic material or a releasable lock may be disposed within and/or about the slot or opening, so as to releasably lock or fix the bent pipe within the slot or opening. In another aspect, the connection checker optionally may be pivotally connected to the connector. In this case, by simply pivoting the connection checker with respect to the connector and the bent pipe, the operator can easily check whether the connector has been properly fitted onto the bent pipe.

According to another aspect of the present teachings, a holder may he provided to hold or retain the connection checker in a rest (e.g., first) position with respect to the connector and the bent pipe. The holder is preferably designed so that the connection checker will not hinder the operation of connecting the bent pipe to the connector when the connection checker is disposed in the rest position. In addition, the holder is preferably designed so that the connection checker is prevented from accidentally moving from the rest position to another position (e.g., a second or pipe engaging position) before the connection checker is intended to be used to check the connecting condition. The holder may, e.g., be disposed on an outer surface of the connector.

According to another aspect of the present teachings, methods are taught for checking the connecting condition between the connector and the bent pipe. Such methods may include checking the connecting condition and preventing the connector from rotating relative to the bent pipe. Such methods also may include fitting the bent pipe into the connector while the connection checker is disposed in the rest position. Then, the connection checker may be moved (e.g., pivoted) towards the bent pipe in order to determine whether the connector has been properly fitted onto the bent pipe. If the connection is proper, the connection checker optionally may be press-fit around the bent pipe, so as to engage the bent pipe. Optionally, the connection checker may prevent the connector from rotating relative to the bent pipe when the connection checker engages the bent pipe. If the connection is not proper when the connection checker is pivoted toward the bent pipe, the position of the bent pipe relative to the connector may be adjusted until the connection checker will properly engage the bent pipe, thereby ensuring a proper connection between the connector and the bent pipe.

Additional objects, features and advantages of the present invention will be readily understood after reading the following detailed description together with the accompanying drawings and the claims.

DETAILED DESCRIPTION OF THE INVENTION

Figure 1:
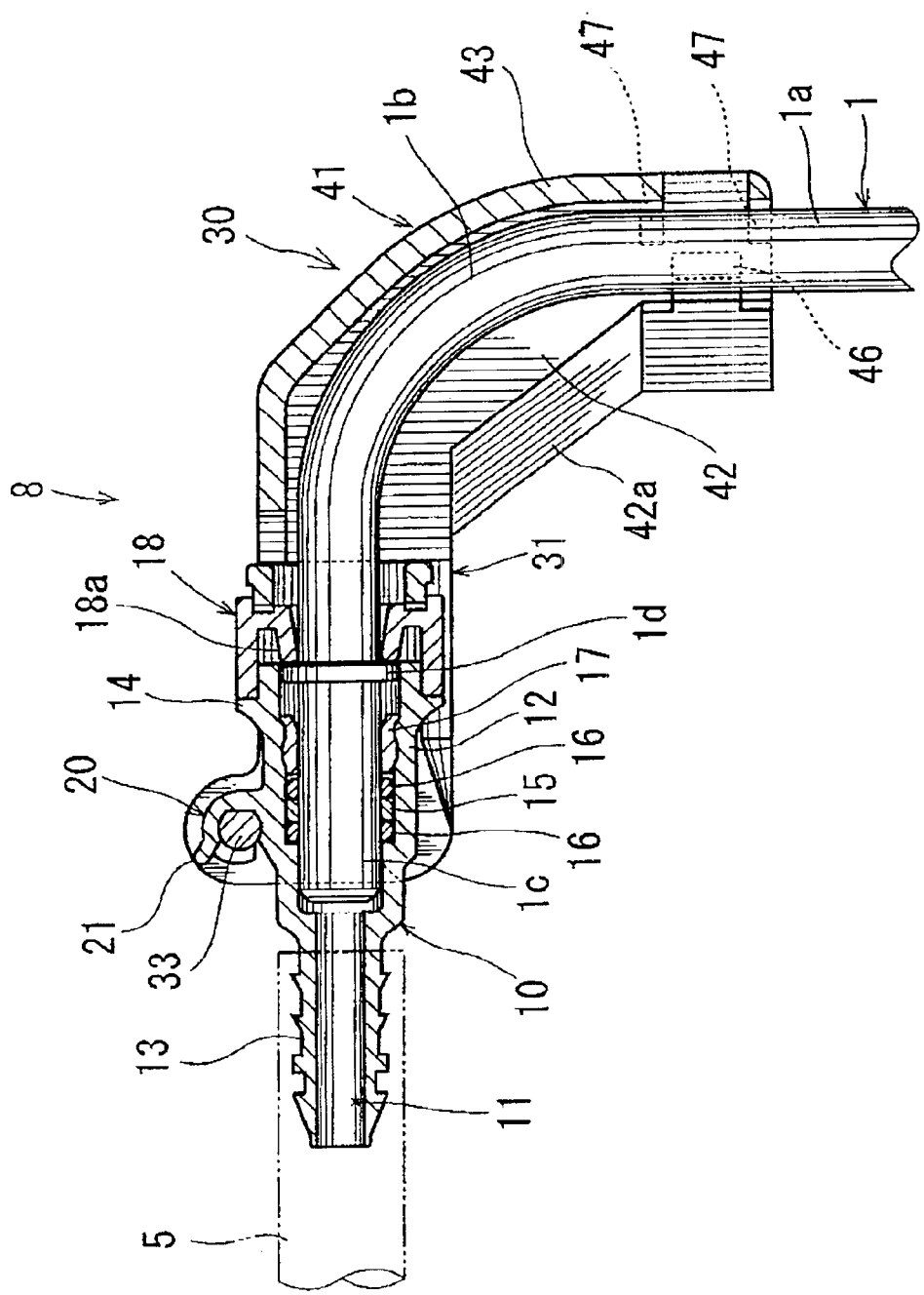
FIG. 1 is a side sectional view of a representative connection checker and a representative connector and showing the representative connection checker fit onto or engaging a representative bent pipe that has been properly connected to the representative connector.

In one embodiment of the present teachings, connector assemblies may include a connector having flow channel defined therein. One end (e.g., a female end) of the flow channel may engagingly receive a tubular conduit. In the representative embodiment described further below, the tubular conduit may be, e.g., a bent pipe. Further, a connection checker may be coupled to the connector. The connection checker may engagingly receive or retain a bent portion of the tubular conduit and ensure a proper connecting condition between the connector and the tubular conduit.

In another embodiment of the present teachings, the connection checker may also prevent the connector from rotating relative to the tubular conduit when the bent portion of the tubular conduit is engagingly received or retained by the connection checker. Further, the connection checker optionally may be pivotable between a first position and a second position. In the first position, the connection checker preferably does, not engage the tubular conduit. The first position may correspond, e.g., to a rest or resting position. In the second position, the connection checker preferably engages or retains the tubular conduit. In another embodiment, a connecting portion, such as a support shaft, may pivotally connect the connector to the connection checker. In another embodiment, the connection checker may be removably detachable from the connector housing.

In another embodiment of the present teachings, the connection checker optionally may include a first fitting portion that is coupled to the connecting portion. The first fitting portion may serve to prevent the connection checker from rotating relative to the connector. In addition, the connection checker also may include a second fitting portion that is disposed in series with the first fitting portion and opposite to the connecting portion. The second fitting portion may have a curved or arcuate configuration, or at least a portion of the second fitting portion may be substantially curved or arcuate, so as to (a) correspond to the configuration of the bent portion of the tubular conduit and (b) engagingly receive or retain the bent portion when the connection checker is in the second position. The first fitting portion optionally may be integrally formed with the second fitting portion.

In another embodiment of the present teachings, the connection checker preferably can not move to the second position (i.e., the tubular conduit engaging position) when the tubular conduit is not properly connected to the connector. For example, when the tubular conduit is not properly connected to the connector, the connection checker may contact the bent pipe from an outer side away from the center of curvature of the bent pipe. In that case, the connection checker (e.g., the detection member or detection means) may be prevented from moving to the second position when the connecting condition of the bent pipe is not appropriate.

In another embodiment of the present teachings, a holder optionally may be provided to hold or retain the connection checker in the first position (e.g., the rest position). Preferably, when disposed in the first position, the connection checker does not hinder the operation for connecting the bent pipe to the connector. Optionally, the connection checker may provide an indication as to the connecting condition as a difference in the relative position in the longitudinal direction of the connector between the connector and the tubular conduit.

In another embodiment of the present teachings, methods are taught for checking whether a connector has been properly connected to a tubular conduit having a bent portion. For example, a connection checker may be moved relative to the connector from a first position to a second position. Preferably, the connection checker engages the bent portion of the tubular conduit in the second position, if the connector has been properly fitted with the tubular conduit. However, if the connection checker did not properly engage the bent portion of the tubular conduit in the second position, the fitting of the connector and the tubular conduit is preferably re-adjusted. Optionally, the connection checker may be provisionally retained in a first or rest position prior to connecting the tubular conduit to the connector. When disposed in the first or rest position, the connection checker preferably does not hinder the operation for connecting the bent pipe (bent tubular conduit) to the connector.

Each of the additional features and teachings disclosed above and below may be utilized separately or in conjunction with other features and teachings to provide improved connector assemblies and methods for designing and using such connector assemblies. A representative example of the present invention, which example utilizes many of these additional features and teachings both separately and in conjunction, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detail description may not be necessary to practice the invention in the broadest sense, and are instead taught merely to particularly describe representative examples of the invention. Moreover, various features of the representative example and the dependent claims may be combined in ways that are not specifically enumerated in order to provide additional useful embodiments of the present teachings.

A representative embodiment of the present teachings will now be described with reference to the drawings. A cross-sectional view of the representative connector assembly 8 is shown in FIG. 1 and the representative connector assembly 8 may include a connector 10 and a connection checker 30. The connector assembly 8 may be utilized to connect a bent pipe (e.g., bent tubular conduit) 1 to another tube, pipe or tubular conduit 5. For example, the tube 5 may be fitted onto the connector 10 on the side opposite to the bent pipe 1. Further, the connection checker 30 may provide an indication as to whether or not the bent pipe 1 has been appropriately joined to the connector 10. Optionally, the connection checker 30 also may prevent the connector 10 from rotating or pivoting relative to the bent pipe 1. These features of the representative embodiment will be explained in further detail below.

Figure 4:
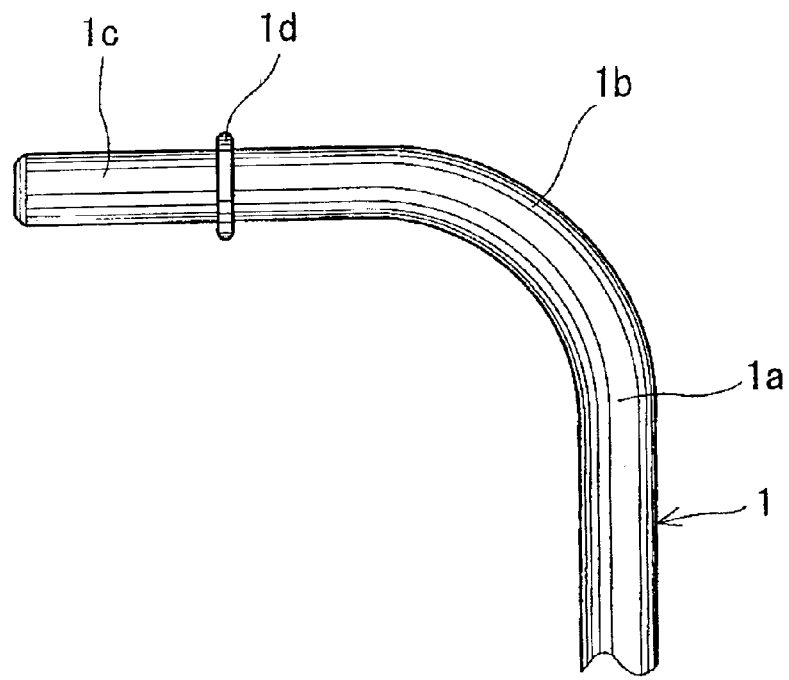
FIG. 4 is a side view of a portion of the representative bent pipe to which the representative connector and representative connection checker may be attached.

As shown in FIG. 4, the representative bent pipe (bent tubular conduit) 1 may include a bent portion 1b that is proximal to an end portion 1c of the bent pipe 1. The bent pipe 1 may comprise metal and/or plastic and may have a substantially circular cross section. The bent portion 1b may be bent at an angle of about 90° between the end portion 1c, which may be substantially straight, and a main portion la, which also may be substantially straight or may be curved. The end portion 1c may be adapted to connect to and engage the connector 10 and may include an annular bulge or flange 1d. Preferably, the annular flange 1d may be displaced from the end surface of the end portion 1c by a predetermined distance and may extend radially outward from the end portion 1c. In addition, the end portion 1c may be tapered toward the end surface (leftward as viewed in FIG. 4).

The representative connector 10 will now be described in further detail with reference to FIG. 2. Because the connector 10 may be constructed according a variety of known constructions, the construction of the representative connector 10 will only be briefly explained. That is, the particular design of the connector 10 is not limited according to the present teachings. In essence, it is only necessary for the connector 10 to engage or receive an end portion 1c of a pipe 1. The tube 5 may be fixedly or detachably attached to the connector 10 and the tube 5 may be made of a variety of materials, including but not limited to resiliently flexible materials. Thus, a variety of "quick connectors" known in art may be advantageously utilized with the present teachings.

Figure 2:
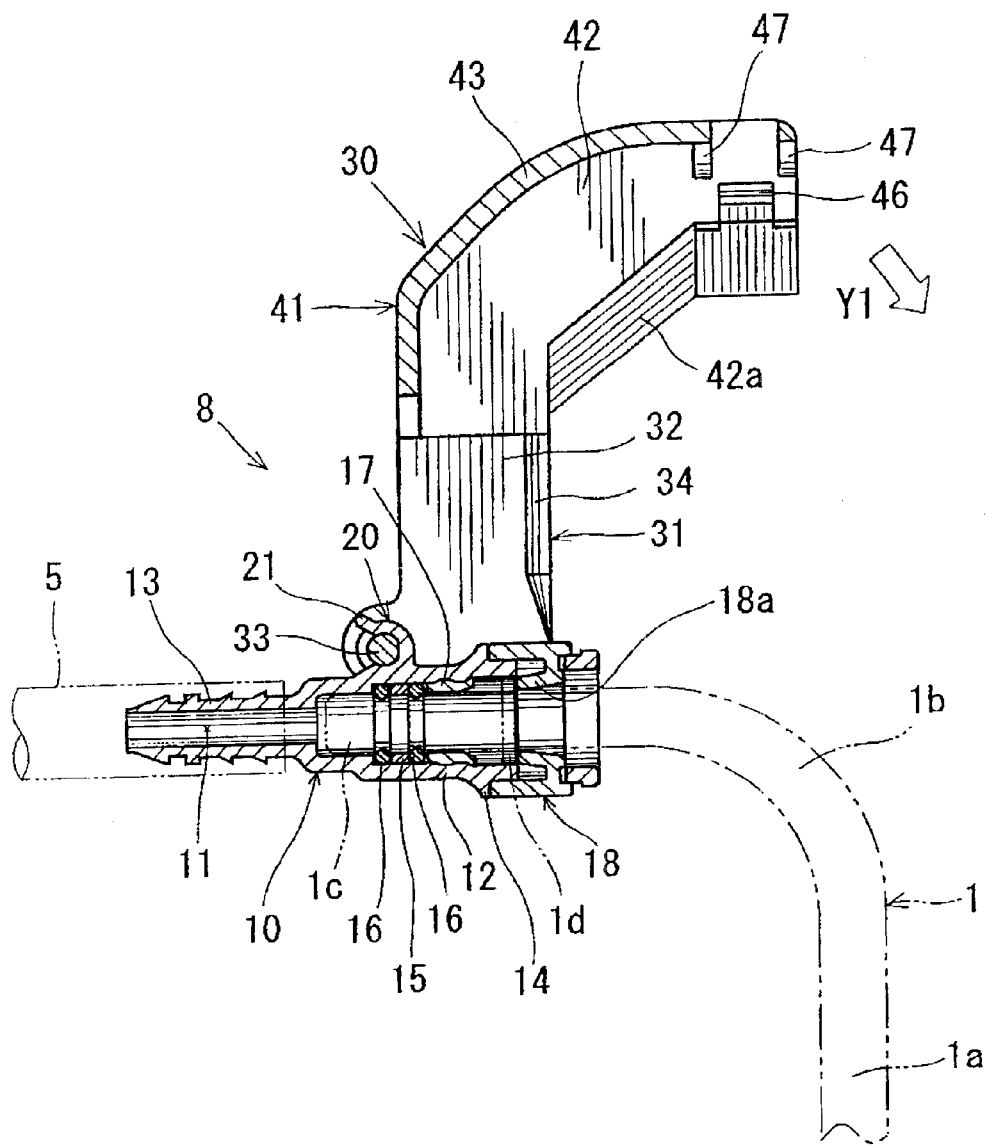
FIG. 2 is a side sectional view similar to FIG. 1, but instead, showing the representative connection checker in a non-secured (i.e., rest or pivoted) position.
Figure 5:
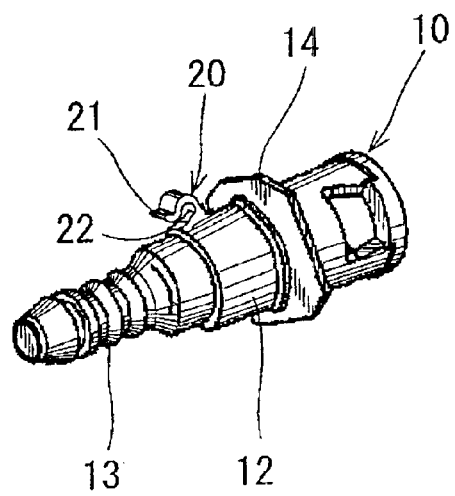
FIG. 5 is a perspective view of a representative connector having a retainer.
Figure 6:
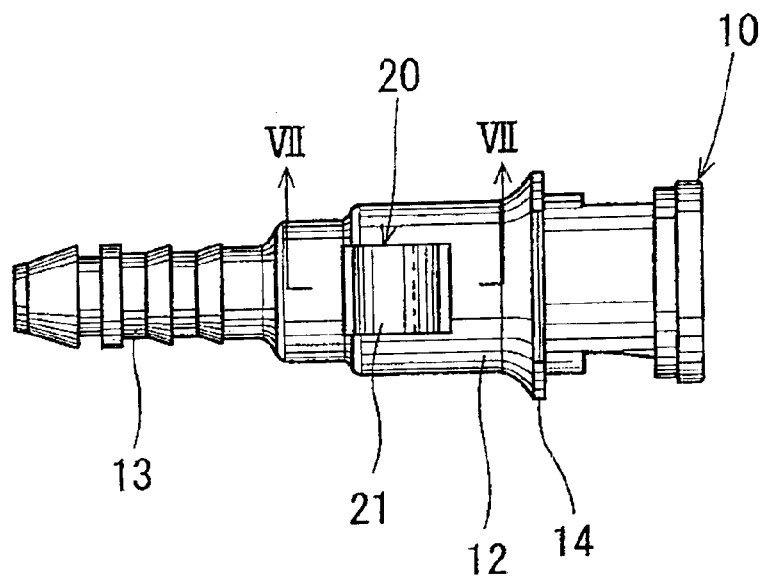
FIG. 6 is a plan view of the representative connector.

As shown in FIG. 2, the representative connector 10 may be formed from a hard plastic or resin material and a flow channel 11 may be defined within the connector 10. Therefore, a fluid, such as fuel, may flow through the flow channel 11. The connector 10 may include a pipe connection portion 12 and a tube fitting portion 13. Pipe connection portion 12 may also be called a "female clement" and tube fitting portion 13 may also be called a "male element." For example, the pipe connection portion 12 may be configured to engagingly receive the end portion 1c of the bent pipe 1, e.g., by inserting the end portion 1c into the pipe connection portion 12. In addition, the outer surface of the tube fitting portion 13 may optionally include circumferential or annular ridges or barbs in order to reliably retain the tube 5 around the tube fitting portion 13. As noted above, the tube 5 may be made of a flexible material. As shown in FIGS. 5 and 6, an octagonal-shaped, plate-like flange 14 may optionally extend radially outward from the pipe connection portion 12.

As shown in FIG. 2, a pair of sealing members (seals) 16, such as resilient O-rings, may be fitted or disposed within the interior of the pipe connection portion 12. Further, a spacer ring 15 may be interposed or interleaved between the sealing members 16. A stopper ring 17 also may be fitted or disposed within the pipe connection portion 12 in a position adjacent to one of the sealing members 16. Therefore, the sealing members 16 can be prevented from being removed from or falling out of the pipe connection portion 12.

A retainer (or lock member) 18 may be fitted or disposed around the rear portion of the pipe connection portion 12. Preferably, the retainer 18 may comprise a resilient plastic and/or resin material. The retainer 18 may include one or more lock portions 18a that extend into the pipe connection portion 12 through one or more corresponding slots formed in the pipe connection portion 12.

Figure 3:
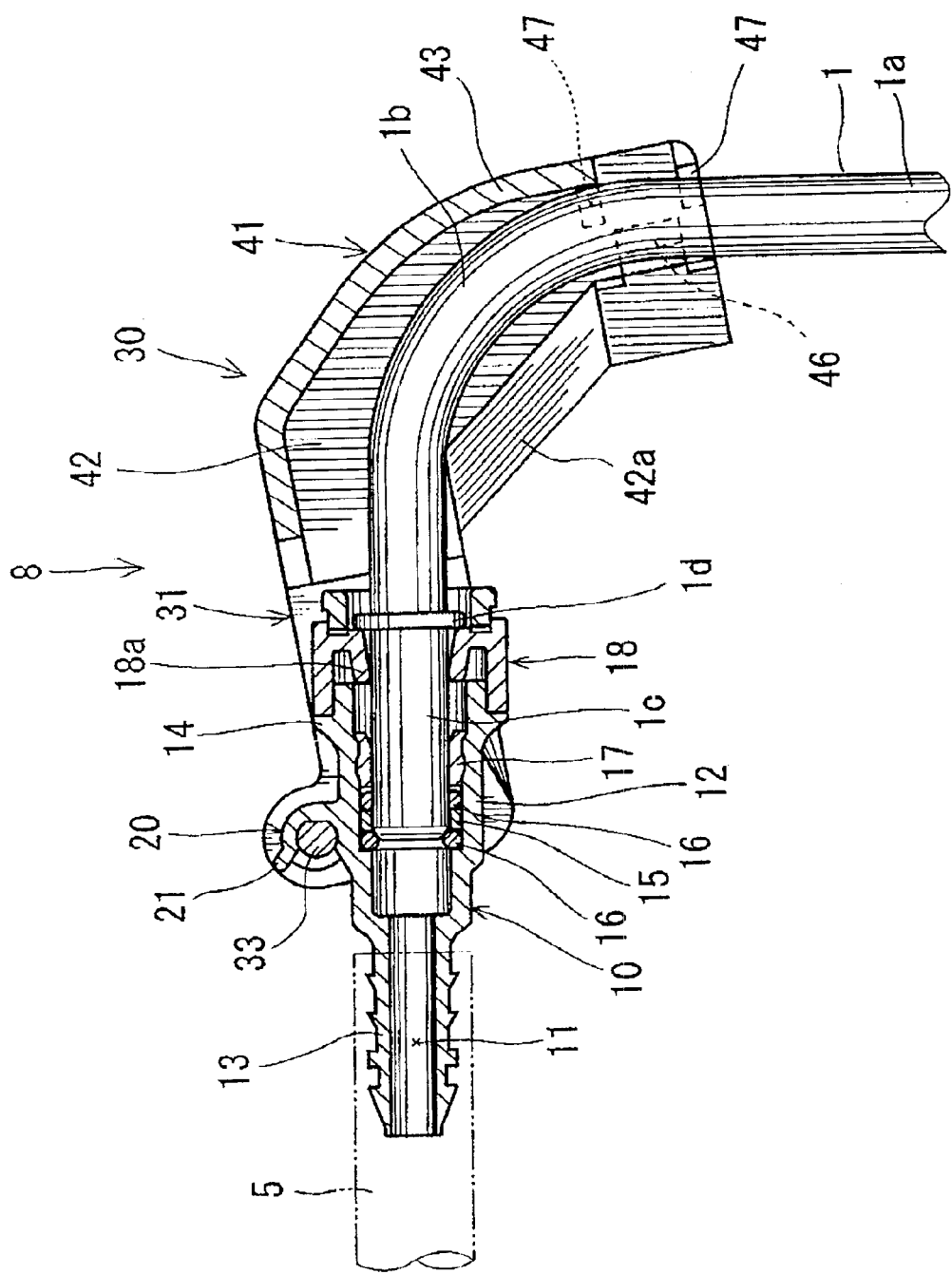
FIG. 3 is a side view similar to FIG. 1, but instead, showing the representative connector in a position, in which the representative connector is not properly connected to the representative pipe.

In order to connect the bent pipe 1 to the connector 10, the front end portion 1c of the bent pipe 1 may be inserted into rear or female portion of the pipe connecting portion 12. As the front end portion 1c moves into the pipe connecting portion 12, the annular flange 1d may contact the lock portions 18a of the retainer 18 and urge the lock portions 18a to outwardly expand. Thus, the retainer 18 may resiliently deform to a larger diameter and the annular flange 1d can pass through the lock portions 18a. As soon as the front end portion 1c moves past the lock portions 18a, the retainer 18 may resiliently recover its original configuration. Thus, the lock portions 18a will extend into the pipe connecting portion 12 and engage or contact the rear surface of the annular flange 1d. Consequently, the bent pipe 1 may be locked in position by the lock portions 18a and may be prevented from being removed from the connector 10 as shown in FIGS. 1 and 2. In this state, the pipe 1 may be appropriately joined to the connector 10. On the other hand, if the annular flange 1d has not sufficiently moved past the lock portions 18a, as shown in FIG. 3, the bent pipe 1 will not be locked in position and may be easily removed from the connector 10. Thus, in this state, the pipe 1 is not appropriately joined to the connector 10.

Figure 7:
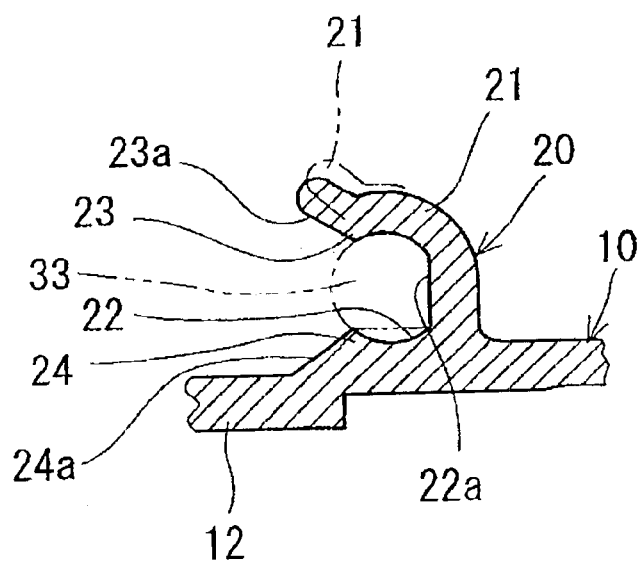
FIG. 7 is a sectional view taken along line VII—VII shown in FIG. 6.

As shown in FIGS. 5 and 6, a bearing portion or holder 20 may be integrally formed with the pipe connection portion 12 and may be disposed on the upper side of the pipe connection portion 12 as viewed in FIG. 2. As shown in FIG. 7, the bearing portion 20 may include an extension 21 that may extend from the pipe connection portion 12. For example, the extension 21 may have a substantially inverted L-shaped cross section and may include a free end that is directed forwardly (leftward as viewed in FIG. 7). Therefore, a substantially C-shaped bearing surface 22 may be defined along the inner surface of the extension 21. Preferably, the extension 21 can resiliently deform such that the free end moves away from the pipe connection portion 12 as indicated by chain lines in FIG. 7 in order to enlarge the opening defined between the free end and the upper surface of the pipe connection portion 12. Thus, the bearing portion 20 may serve as a holder that permits the connection checker 30 to pivot with respect to the connector 10.

The bearing portion 20 also may include first and second projections 23 and 24 that define the respective terminal ends of the bearing surface 22. The first projection 23 and the second projection 24 may each have a substantially angular or curved configuration. The first projection 23 may extend from the inner surface of the extension 21 and the second projection 24 may extend from the upper surface of the pipe connection portion 12. Therefore, the first projection 23 preferably opposes the second projection 24 in the vertical direction as viewed in FIG. 7. The first projection 23 and the second projection 24 may respectively define a first guide surface 23a and a second guide surface 24a within the opening of the bearing portion 20, as viewed in FIG. 7. The distance between the first guide surface 23a and the second guide surface 24a may increase toward the left side direction as shown in FIG. 7. In this case, a support shaft 33 coupled to the connection checker 30 can easily fit within the space defined by the bearing surface 22 (e.g., the first and second guide surfaces 23a and 24a and flat bottom 22a). The support shaft 33 will be explained in further detail below. Further, the bearing surface 22 optionally may include the flat bottom 22a that opposes to the opening and is disposed on the right side as viewed in FIG. 7. The flat bottom 22a may serve to prevent the support shaft 33 from rotating, as will be discussed further below.

Figure 8:
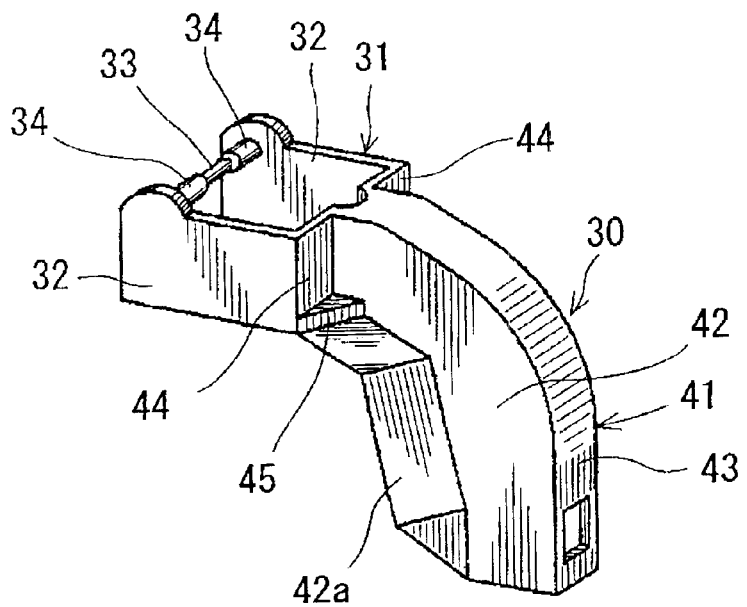
FIG. 8 is a perspective view of the representative connection checker.
Figure 9:
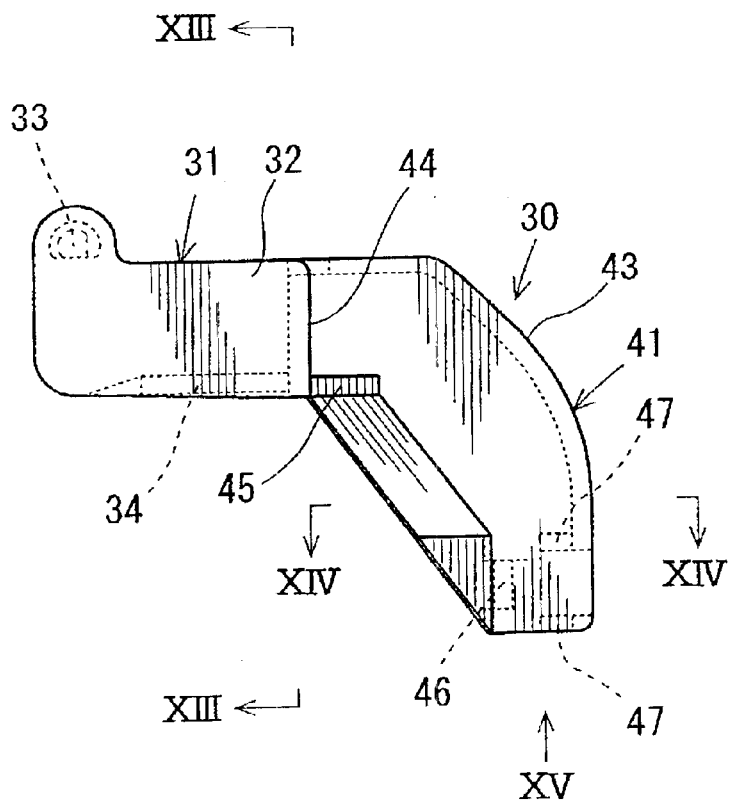
FIG. 9 is a side view of the representative connection checker.
Figure 10:
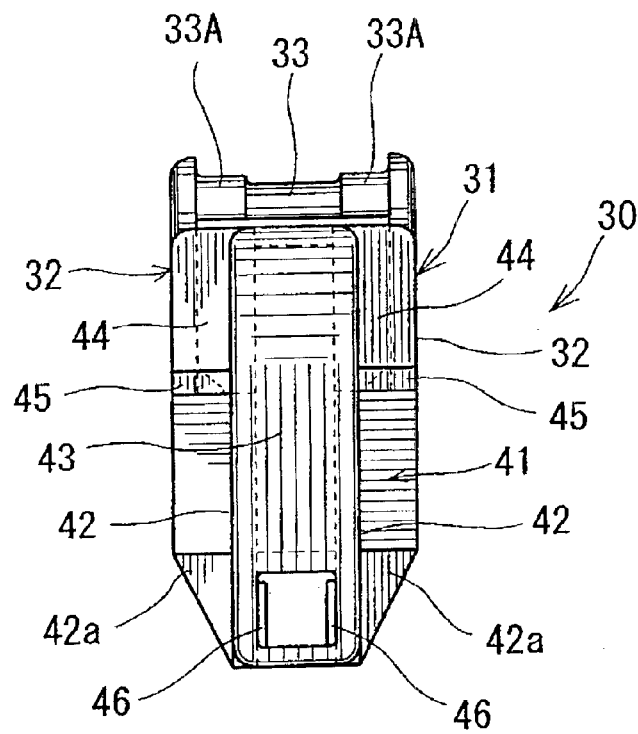
FIG. 10 is a rear view of the representative connection checker.
Figure 11:
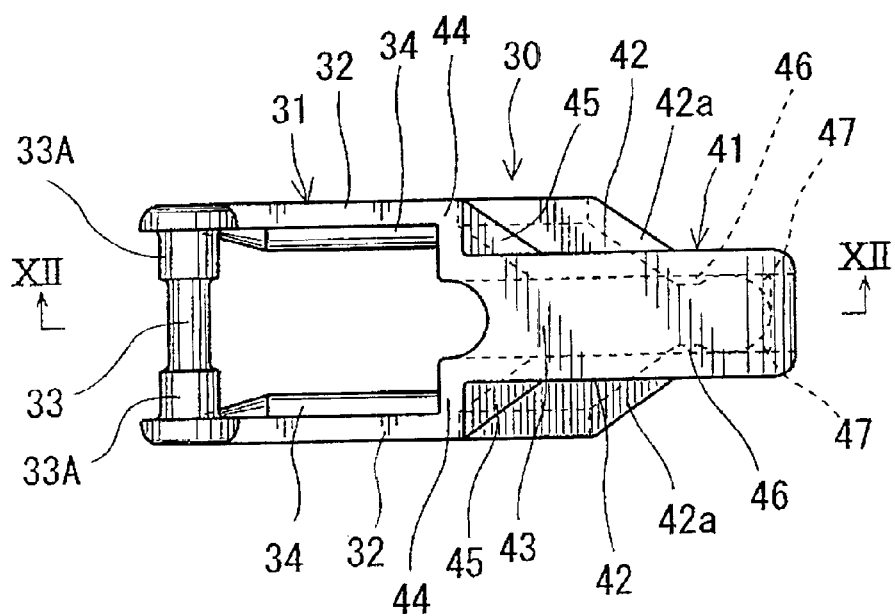
FIG. 11 is a plan view of the representative connection checker.

The representative connection checker 30 will now be described in further detail with reference to FIGS. 8 to 16. The connection checker 30 may be formed, e.g., from a plastic or resin material and may include a first fitting portion 31 and a second fitting portion 41 that are disposed in a substantially L-shaped configuration as shown in FIG. 8. The inner surface of the first fitting portion 31 may be configured so as to substantially correspond to the outer surface of the pipe connection portion 12, as shown in FIG. 1. The inner surface of the second fitting portion 41 may be configured so as to substantially correspond to the outer surface of the bent portion 1b and the portions of the bent pipe 1 proximal to the bent portion 1b. In a preferred embodiment, the connection checker 30 may have a substantially symmetrical configuration about a vertical central plane that extends upward and downward, as shown in FIG. 10, and that extends rightward and leftward, as shown in FIG. 11.

As shown in FIGS. 8 to 12, the first fitting portion 31 may include a pair of right and left side plates 32 that each has a substantially rectangular configuration. The support shaft 33 may extend between the upper and front side ends of the side plates 32. A pair of opposing inner edges 34 may extend from the respective lower sides of the right and left side plates 32.

Figure 13:
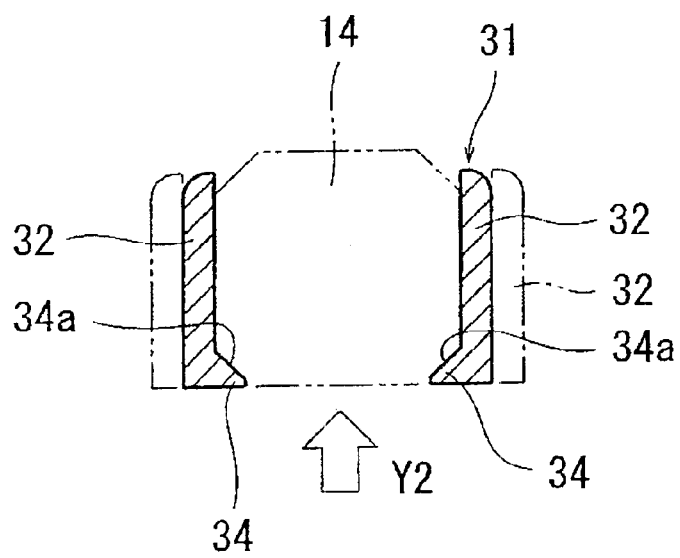
FIG. 13 is a sectional view taken along line XIII—XIII shown in FIG. 9.

As shown in FIG. 13, the flange portion 14 of the connector 10 (see FIG. 5) may be received between the side plates 32 such that the flange portion 14 can be prevented from rotating relative to the first fitting portion 31. Each of the inner edges 34 optionally may define an upper surface 34a that is inclined downwardly toward the interior of the first fitting portion 31. The inclination angle of the upper surface 34a is preferably selected so as to conform to the Configuration of the corresponding side of the flange portion 14 (e.g., one side of an octagon). As shown in FIG. 13, the side plates 32 may resiliently deform in order to receive the flange portion 14 of the connector 10 from the lower side as indicated by arrow Y2 in FIG. 13.

As shown in FIGS. 1 and 3, the support shaft 33 may be fitted into the bearing portion 20, so that the support shaft 33 can rotate or pivot relative to the bearing portion 20. As shown in FIGS. 10 and 11, large-diameter portions 33A may be formed on both ends of the support shaft 33. In this case, the extension 21 of the bearing portion 20 may be positioned between the large-diameter portions 33A so as to be restrained from moving in the axial direction. Optionally, the support shaft 33 may include flat surfaces 33a and 33b as shown in cross section in FIG. 16. The flat surfaces 33a and 33b may extend substantially perpendicular to each other and may respectively serve as a provisional engaging surface and a lock surface, as will be further explained below.

Figure 14:
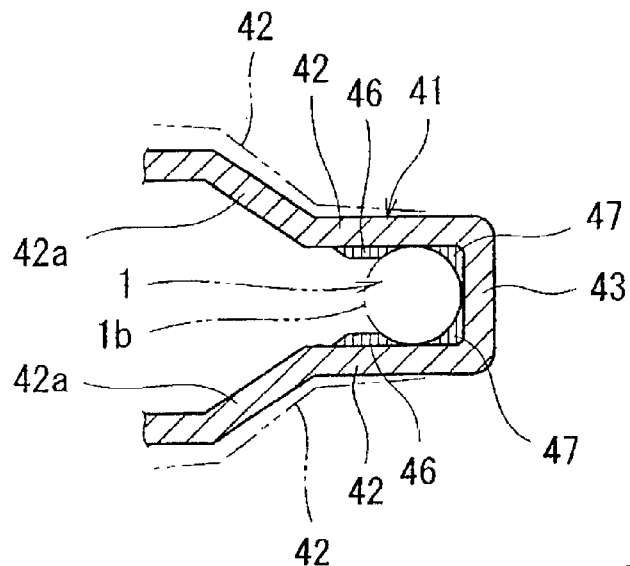
FIG. 14 is a sectional view taken along line XIV—XIV shown in FIG. 9.
Figure 15:
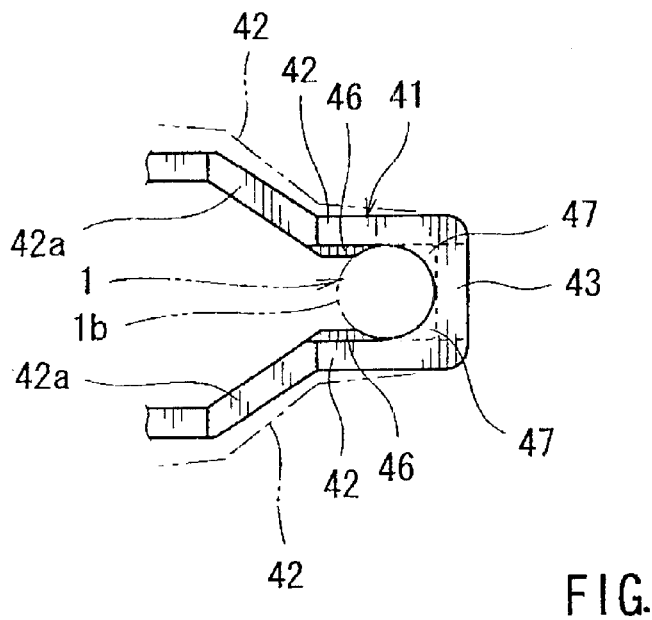
FIG. 15 is a view in a direction of arrow XV shown in FIG. 9.

Referring again to FIGS. 8 to 12, the second fitting portion 41 of the connection checker 30 may include two substantially arc-shaped side plates 42 and a detection plate 43. The detection plate 43 may extend between the upper edges of the side plates 42. In this case, the detection plate 43 may have a curved configuration that conforms, or substantially conforms, to the upper edges of the slide plates 42. As shown in FIG. 11, the front ends of the side plates 42 may be connected to the rear ends of the corresponding side plates 32 of the first fitting portion 31 via respective joint plates 44. For example, the second fitting portion 41 may be designed such that the portions of the bent pipe 1 that are proximal to the bent portion 1b may be engagingly received within the second fitting portion 41, as shown in FIGS. 1, 14 and 15. Skirt portions 42a may extend from the lower edges of the respective side plates 42 on the side opposite to the detection plate 43. The portions of the skirt portions 32a that are adjacent to the side plates 42 may be inclined, so that the distance between these parts increases in the downward direction (left side as viewed in FIGS. 14 and 15). The skirt portions 42a may be connected to the respective joint plates 44 via substantially triangular-shaped ribs 45, as shown in FIG. 8.

Referring again to FIGS. 14 and 15, a pair of removal prevention projections 46 may extend from the respective inner surfaces of the respective side plates 42 and may oppose to each other. As shown in FIG. 9, the removal prevention projections 46 may be elongated in the vertical direction. Preferably, when the bent pipe 1 is press-fitted into the connection checker 30, the second fitting portion 41 may resiliently deform so as to increase the distance between the lower sides (left sides as viewed in FIGS. 14 and 15) of the side plates 42, as indicated by chain lines in FIGS. 14 and 15. As a result, the main portion 1a of the bent pipe 1 may be fitted (e.g., press-fitted) into the second fitting portion 41. The removal prevention projections 46 optionally may each have a trapezoidal configuration. In this case, the second fitting portion 41 can easily deform in order to increase the distance between the side plates 42 when the main portion 1a of the bent pipe 1 is forcibly inserted into the second fitting portion 41. In addition, after the main portion 1a of the bent pipe 1 has been completely inserted into the second fitting portion 41, the second fitting portion 41 preferably resiliently recovers its original shape or configuration. Therefore, the removal prevention projections 46 will engagingly contact the outer surface of the main portion 1a of the bent pipe 1 in surface-to-surface contact relationship and the main portion 1a can be reliably prevented from being accidentally removed from the second fitting portion 41.

Figure 12:
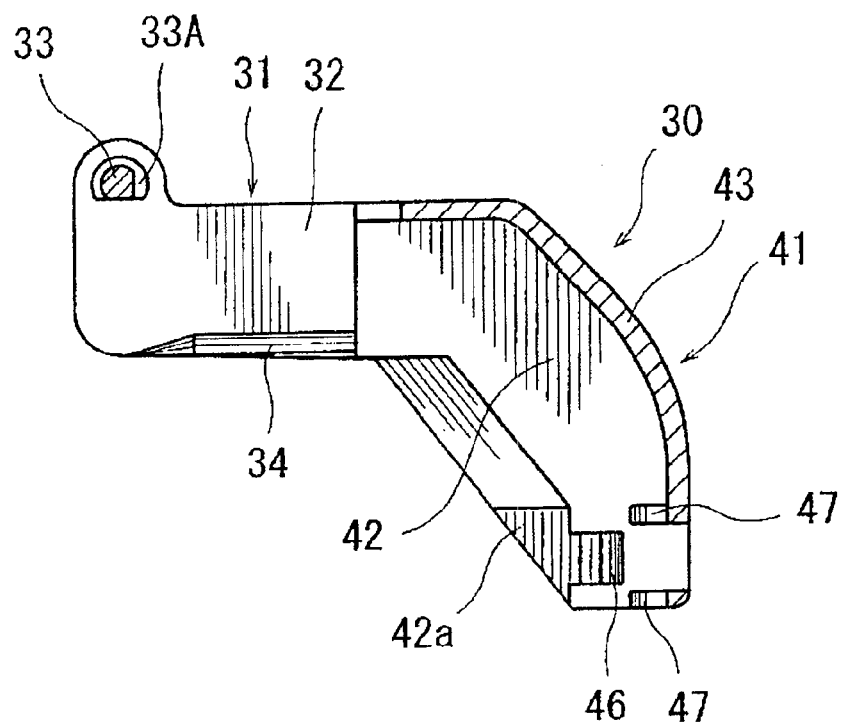
FIG. 12 is a sectional view taken along line XII—XII shown in FIG. 11.

As shown in FIGS. 12, 14 and 15, upper and lower pairs of stoppers 47 may be formed on the respective inner corners defined by the side plates 42 and the detection plate 43. The upper and lower pairs of the stoppers 47 may be displaced from each other in the vertical direction. Preferably, the positions of these stoppers 47 are selected so that the removal prevention projections 46 are positioned between the upper pair of the stoppers 47 and the lower pair of the stoppers 47. Also, as shown in FIGS. 14 and 15, the stoppers 47 may contact the outer surface of the main portion 1a of the bent pipe 1 in surface-to-surface contact relationship when the main portion 1a of the bent pipe 1 has been completely inserted into the second fitting portion 41.

In order to assemble the connection checker 30 with the connector 10, the support shaft 33 of the connection checker 30 (see FIG. 8) may be forcibly inserted into the opening of the bearing portion 20. Preferably, the extension 21 can resiliently deform in order to permit the support shaft 33 to pass into the opening of the bearing portion 20, as shown in FIG. 7. Thereafter, the extension 21 preferably resiliently recovers its original configuration as soon as the support shaft 33 has been fitted into the bearing portion 20. As a result, the support shaft 33 may slidably contact the bearing surface 22, so that the connection checker 30 can pivot relative to the connector 10 about the support shaft 33.

Optionally, the connection checker 30 may be pivoted to a rest or non-secured (first) position as shown in FIG. 2, in which the flat surface 33a of the support shaft 33 contacts the flat bottom 22a of the bearing surface 22 in surface-to-surface contact relationship. Therefore, in the rest position, the connection checker 30 may be provisionally held or retained in a pivoted position.

While the connection checker 30 is disposed in the rest or first position, the end portion 1c of the bent pipe 1 may be joined to (e.g., inserted into) the connector 10. Either prior to or after connecting the bent pipe 1 to the connector 10, the tube 5 may be fitted onto the tube connection portion 13. As noted above, the tube 5 may be made of a flexible, resilient material and may resiliently deform so as to fit around the tube connection portion 13. The tube 5 may be any type of tube, such as a flexible tube or other conduit. In addition, the tube 5 optionally may be integrally formed with the connector 10 and the tube connection portion 13 may be omitted or modified as appropriate.

The end portion 1c of the bent pipe 1 is preferably inserted into the pipe connection portion 12, so that the bent pipe 1 can be fixed in position in the axial direction by means of the resiliently deformable retainer 18. When the bent pipe 1 has been appropriately joined to the connector 10, the front end surface of the end portion 1c may press against (contact) the rear seal member 16. In this case, the front end surface of the end portion 1c will be sealed against the inner surface of the connector 10.

The connection checker 30 may be utilized to indicate whether or not the bent pipe 1 has been appropriately connected to the connector 10. For example, the connection checker 30 may properly fit around the bent pipe 1 when the bent pipe 1 has been appropriately connected. On the other hand, if the bent pipe 1 has not been appropriately connected to the connector 10, the connection checker 30 preferably does not properly fit around the bent pipe 1. In the latter case, the operator will understand that the position of the connector 10 should be adjusted in order to properly connect the connector 10 to the pipe 1.

For example, the connection checker 30 may be pivoted about the support shaft 33 from the rest (first) position in the direction that is indicated by arrow Y1 in FIG. 2. As the connection checker 30 pivots, the flat surface 33a of the support shaft 33 moves relative to the flat bottom 22a of the bearing surface 22. Therefore, the extension 21 may resiliently deform such that the free end of the extension 21 will move away from the outer surface of the pipe connection portion 12. As the connection checker 30 further pivots, the other flat surface 33b of the support shaft 33 may be brought into contact with the flat bottom 22a in surface-to-surface contact relationship and the extension 21 will resiliently recover its original if configuration. As a result, the connection checker 30 may be fixed in the locked or engaged (second) position shown in FIG. 1, which position optionally may be displaced from the rest (first) position by an angle of about 90°.

Furthermore, as the connection checker 30 pivots from the rest (first) position to the locked (second) position, the first fitting portion 31 may fit around the pipe connecting portion 12. For example, the first fitting portion 31 may fit around and engage the flange portion 14 of the pipe connecting portion 12, due to the resilient deformation of the side walls 42. As a result, the connection checker 30 may be prevented from rotating about the longitudinal axis of the connector 10.

At the same time, the second fitting portion 41 may fit around and engage the bent portion 1b of the bent pipe 1 as shown in FIG. 1. Further, the removal prevention portions 46 may engage the main portion 1a, duc to the resilient deformation of the opposing side plates 32, which is indicated by chain lines in FIGS. 14 and 15. In this case, the removal prevention portions 46 and the stoppers 47 will engagingly contact the second fitting portion 41 in surface-to-surface contact relationship. As a result, the bent pipe 1 can be reliably prevented from rotating relative to the connector 10.

Preferably, the connection checker 30 may be properly fitted onto the bent pipe 1 only when the end portion 1c of the bent pipe 1 has been properly joined to the connector 10. In other words, preferably the operator can recognize that the bent pipe 1 has been properly joined to the connector 10, because the connection checker 30 has properly fitted onto the bent pipe 1.

On the other hand, the connection checker 30 preferably does not properly fit onto the bent pipe 1 when the bent pipe 1 has not been properly joined to the connector 10, as shown in FIG. 3. In this case, the annular flange 1d has not been moved forwardly beyond the lock portions 18a of the retainer 18. Therefore, when the connection checker 30 pivots in the direction of the arrow Y1 in FIG. 2 from the outer side of the bent portion 1b (the side away from the center or curvature of the bent portion lab), the detection plate 43 will contact the outer surface of the bent pipe 1 at an intermediate position between the main portion 1a and the bent portion 1b. As a result, the main portion 1a preferably does not properly fit between the removal prevention portions 46 and the stoppers 47 of the connection checker 30. Therefore, the operator can easily recognize that the bent pipe 1 has not been properly joined to the connector 10 and can take corrective action.

When an improper connection has been detected, the operator may return the connection checker 30 to the rest (first) position shown in FIG. 2. Subsequently, the operator may once more push the end portion 1c of the bent pipe 1 into the connector 10 so as to properly join the bent pipe 1 to the connector 10. Thereafter, the operator may once again pivot the connection checker 30 in order to determine whether or not the bent pipe 1 has been properly joined to the connector 10. Therefore, the bent pipe 1 can reliably ensure proper connections between the connector 10 and the pipe 1.

In this representative embodiment, when the connection checker 30 has been fitted onto the bent pipe 1, the connection checker 30 may prevent the bent pipe 1 from rotating relative to the connector 10. Therefore, the connection checker 30 may serve a dual function of (a) checking the connection state of the bent pipe 1 and (b) preventing the bent pipe 1 from rotating relative to the connector 10. Further, by pivotally mounting the connection checker 30 on the connector 10, the connection state of the bent pipe 1 and the connector 10 can be easily determined by simply pivoting the connection checker 30 relative to the connector 10.

In addition, because the connection checker 30 is arranged such that the detection plate 43 contacts the bent pipe 1 from the outer side of the bent pipe 1, the bent pipe 1 does not require a projection or a similar portion that is specially designed to cooperate with the connection checker 30.

Furthermore, because the connection checker 30 is arranged to contact the bent pipe 1 from the outer side away from the center of curvature of the bent pipe 1, the connection checker 30 will pivot through the space on the outer side of the bent pipe 1. Therefore, in particular when the connector 10 will be utilized in a narrow space, such as an engine compartment of an automobile, it is easier to operate the connection checker than if the connection checker contacts the bent pipe from the inner side of the bent pipe. For example, if the bent pipe 1 is joined to the connector 10 with the end portion 1c oriented upward, while the main portion 1a extends horizontally, the connection checker 30 can be easily operated from the upper side.

Figure 16:
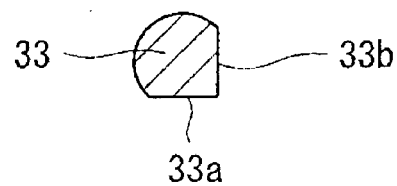
FIG. 16 shows a cross-section of a representative support shaft that may be utilized to pivotally couple the representative connector to the representative connection checker.

Moreover, as shown in FIG. 2, the connection checker 30 may be hell or retained in the rest (first) position by the provisional support means that is defined by the flat bottom 22a of the bearing surface 22 (see FIG. 7) and the flat surface 33a of the support shaft 33 (see FIG. 16). Therefore, the connection checker 30 may be reliably prevented from accidentally pivoting away from the rest position before the connection checker 30 is pivoted toward the pipe 1 in order to determine the connection state of the bent pipe 1 and the connector 10.

The above representative embodiment may be modified in various ways. For example, although the connector 10 is adapted to join the bent pipe 1 to the tube 5, the connector 10 may be modified in various ways without departing from the spirit of the present teachings. In addition, although the connector 10, the retainer 18 and the connection checker 30 are preferably made of plastic, one or more of these elements may be made of metal, such as aluminum alloy and/or brass. Further, although the retainer 18 serves to lock the bent pipe 1 through resilient deformation of the retainer 18, the retainer 18 may lock the bent pipe 1 by means of a shift mechanism that may shift the retainer from a locked position to an unlocked position. Moreover, the retainer 18 may be omitted in some arrangements. Furthermore, although the connection checker 30 was mounted on the connector 10 before the bent pipe 1 is joined to the connector 10, the connection checker 30 may be mounted on the connector 10 only for the purpose of checking the connection state. Thereafter, the connection checker 30 can be removed from the connector 10. In addition, although the connection checker 30 was pivotally mounted on the connector 10, the connection checker 30 may be slidably mounted on the connector 10. Furthermore, the detector plate 43 may have a variety of configurations as long as the detector plate 43 can contact the bent pipe (in particular, the main portion 1a and/or the bent portion 1b) from the outer side of the bent portion 1b.

In some cases, the provisional support means, which may be defined by the flat bottom 22a of the bearing surface 22 and the flat surface 33a of the support shaft 33, may be omitted. In addition, with regard to the connection checker 30, at least one of the fitting devices that is defined by the inner edges 34 of the first fitting portion 31 for engaging the flange 14 and the fitting device that is constructed by the removal prevention portions 46 of the second fitting portion 41 may be omitted. Further, the annular flange 1d may be replaced with any other type of projection having a different configuration, as long as the projection can perform the same, or substantially the same, function as the annular flange 1d.

What is claimed is:

1. An apparatus, comprising:
    a connector having a flow channel defined therein, wherein one end of the flow channel is arranged and constructed to engagingly receive a tubular conduit having a bent portion, and
    a connection checker coupled to the connector, the connection checker being arranged and constructed to engagingly receive the bent portion of the tubular conduit to ensure that the connector is engagingly joined to the tubular conduit,
    wherein the connection checker engagingly receives the bent portion of the tubular conduit when the tubular conduit is engagingly joined to the connector, and the connection checker does not engagingly receive the bent portion of the tubular conduit when the tubular conduit is not engagingly joined to the connector, whereby an operator can recognize whether or not the tubular conduit is engagingly joined to the connector.

2. An apparatus as in claim 1, wherein the connection checker is further arranged and constructed to prevent the connector from rotating relative to the tubular conduit when the bent portion of the tubular conduit is engagingly received within the connection checker.

3. An apparatus as in claim 2, wherein the connection checker is pivotable between a first position and a second position, wherein in the first position, the connection checker is arranged and constructed so as not to engage the tubular conduit and in the second position the connection checker is arranged and constructed so as to engage the tubular conduit.

4. An apparatus as in claim 3, further comprising a connecting portion pivotally connecting the connector to the connection checker.

5. An apparatus as in claim 4, wherein the connection checker further includes a first fitting portion coupled to the connecting portion, the first fitting portion being arranged and constructed so as to prevent the connection checker from rotating relative to the connector.

6. An apparatus as in claim 5, wherein the connection checker further includes a second fitting portion disposed in series with the first fitting portion and opposite to the connecting portion, the second fitting portion having a curved configuration or shape so that an inner surface of the second fitting portion (a) will substantially correspond to the outer configuration of the bent portion of the tubular conduit and (b) will engagingly receive the bent portion when the connection checker is in the second position.

7. An apparatus as in claim 6, wherein the first fitting portion is integrally formed with the second fitting portion.

8. An apparatus as in claim 7, wherein the connection checker is arranged and constructed such that the connection checker can not move to the second position when the tubular conduit is not engagingly joined to the connector.

9. An apparatus as in claim 8, wherein the connection checker is arranged and constructed to approach the tubular conduit from an outer side away from the center of curvature of the bent portion, so that the connection checker is prevented from moving to the second position from the first position when the tubular conduit is not engagingly joined to the connector.

10. An apparatus as in claim 9, further including a holder that is arranged and constructed to hold or retain the connection checker in the first position, whereby the connection checker does not hinder the operation for connecting the tubular conduit to the connector when the connection checker is in the first position.

11. An apparatus as in claim 10, wherein the connection checker is arranged and constructed so as to indicate the connecting condition in response to a difference in the relative position in the longitudinal direction of the connection checker with respect to the connector and the tubular conduit.

12. An apparatus as in claim 11, wherein the connection checker is removably detachable from the connector.

13. An apparatus, comprising:
a connector having flow channel defined therein, wherein one end of the flow channel is arranged and constructed to engagingly receive a tubular conduit having a bent portion, said bent portion having an inner configuration and an outer configuration, and
a connection checker coupled to the connector, the connection checker being arranged and constructed to engagingly receive the bent portion of the tubular conduit to ensure that the connector is engagingly joined to the tubular conduit,
wherein the connection checker is pivotable between a first position and a second position, wherein in the first position, the connection checker is arranged and constructed so as not to engage the tubular conduit and in the second position the connection checker is arranged and constructed so as to engage the tubular conduit,
wherein the connection checker further includes a first fitting portion that is arranged and constructed so as to prevent the connection checker from rotating relative to the connector, and
wherein the connection checker further includes a second fitting portion disposed in series with the first fitting portion, the second fitting portion having a curved configuration or shape so that an inner surface of the second fitting portion (a) will substantially correspond to the outer configuration of the bent portion of the tubular conduit and (b) will engagingly receive the bent portion when the connection checker is in the second position.

14. An apparatus as in claim wherein the connection checker is arranged and constructed such that the connection checker can not be moved to the second position when the tubular conduit is not engagingly joined to the connector.

15. An apparatus as in claim 14, wherein the connection checker is arranged and constructed to approach the tubular conduit from an outer side away from the center of curvature of the bent portion, so that the connection checker is prevented from moving to the second position from the first position when the tubular conduit is not engagingly joined to the connector.

16. An apparatus as in claim 13, further including a holder that is arranged and constructed to hold or retain the connection checker in the first position, whereby the connection checker does not hinder the operation for connecting the tubular conduit to the connector when the connection checker is in the first position.

17. An apparatus as in claim 13, wherein the connection checker is arranged and constructed so as to indicate the connecting condition in response to a difference in the relative position in the longitudinal direction of the connection checker with respect to the connector and the tubular conduit.

18. An apparatus as in claim 13, wherein the connection checker is removably detachable from the connector.

19. An apparatus, comprising:
a connector a having flow channel defined therein, wherein one end of the flow channel is arranged and constructed to engagingly receive a tubular conduit having a bent portion, and
a first means for ensuring that the connector is engagingly joined to the tubular conduit, the first means being coupled to the connector and being configured to engagingly receive the bent portion of the tubular conduit,
wherein the first means engagingly receives the bent portion of the tubular conduit when the tubular conduit is engagingly joined to the connector, and the first means does not engagingly receive the bent portion of the tubular conduit when the tubular conduit is not engagingly joined to the connector, whereby an operator can recognize whether or not the tubular conduit is engagingly joined to the connector.

20. An apparatus as in claim 19, further comprising a second means for preventing the connector from rotating relative to the tubular conduit when the bent portion of the tubular conduit is engagingly received by the first means.

21. An apparatus as in claim 20, wherein the first and second means are disposed in series and the first means has an inner configuration that (a) will substantially correspond to the outer configuration of the bent portion of the tubular conduit and (b) will engagingly receive the bent portion.

22. An apparatus as in claim 19, wherein the first and second means are pivotable between a first position and a second position, wherein in the first position, the first means can not engage the tubular conduit and in the second position the first means can engage the tubular conduit.

23. An apparatus as in claim 22, further comprising a means for preventing the first and second means from moving to the second position when the tubular conduit is not engagingly joined to the connector.

24. An apparatus as in claim 19, further comprising a third means for pivotally connecting the connector to the first and second means.

25. An apparatus as in claim 24, wherein the third means permits the connector to be detached from the first and second means.

26. A method for checking whether a connector has been engagingly joined to a tubular conduit having a bent portion, comprising:
pivotally moving a connection checker relative to the connector from a first position to a second position within a plane that extends substantially through a longitudinal axis of the connector, wherein the connection checker engages the bent portion of the tubular conduit in the second position if the connector has been engagingly joined to the tubular conduit; and
re-adjusting the fitting of the connector and the tubular conduit, if the connection checker prevented engagement with the bent portion of the tubular conduit in the second position.

27. A method as in claim 26, further including provisionally retaining the connection checker in the first position prior to connecting the tubular conduit to the connector, wherein the connection checker does not hinder the operation for connecting the tubular conduit to the connector when the connection checker is in the first position.

28. An apparatus comprising:
a connector having a flow channel defined therein, wherein one end of the flow channel is arranged and constructed to engagingly receive a tubular conduit having a bent portion, and
a connection checker coupled to the connector, the connection checker being arranged and constructed to engagingly receive the bent portion of the tubular conduit to ensure that the connector is engagingly joined to the tubular conduit,
wherein the connection checker is pivotable between a first position and a second position, wherein in the first position, the connection checker is arranged and constructed so as not to engage the tubular conduit and in the second position the connection checker is arranged and constructed so as to engage the tubular conduit.

29. An apparatus as in claim 28, wherein the connection checker is further arranged and constructed to prevent the connector from rotating relative to the tubular conduit when the bent portion of the tubular conduit is engagingly received within the connection checker.

30. An apparatus as in claim further 28, comprising a connecting portion pivotally connecting the connector to the connection checker.

31. An apparatus as in claim 30, wherein the connection checker further includes a first fitting portion coupled to the connecting portion, the first fitting portion being arranged and constructed so.as to prevent the connection checker from rotating relative to the connector.

32. An apparatus as in claim 31, wherein the connection checker further includes a second fitting portion disposed in series with the first fitting portion and opposite to the connecting portion, the second fitting portion having a curved configuration or shape so that an inner surface of the second fitting portion (a) will substantially correspond to the outer configuration of the bent portion of the tubular conduit and (b) will engagingly receive the bent portion when the connection checker is in the second position.

33. An apparatus as in claim 32, wherein the first fitting portion is integrally formed with the second fitting portion.

34. An apparatus as in claim 28, wherein the connection checker is arranged and constructed such that the connection checker can not be moved to the second position when the tubular conduit is not engagingly joined to the connector.

35. An apparatus as in claim 34, wherein the connection checker is arranged and constructed to approach the tubular conduit from an outer side away from the center of curvature of the bent portion, so that the connection checker is prevented from moving to the second position from the first position when the tubular conduit is not engagingly joined to the connector.

36. An apparatus as in claim 28, further including a holder that is arranged and constructed to hold or retain the connection checker in the first position, whereby the connection checker does not hinder the operation for connecting the tubular conduit to the connector when the connection checker is in the first position.

37. An apparatus as in claim 28, wherein the connection checker is arranged and constructed so as to indicate the connecting condition in response to a difference in the relative position in the longitudinal direction of the connection checker with respect to the connector and the tubular conduit.

38. An apparatus as in claim 28, wherein the connection checker is removably detachable from the connector.

39. An apparatus as in claim 28, wherein the connection checker is mounted on the connector so as to be assembled with the connector.

40. An apparatus as in claim 28, wherein the connection checker is pivotable relative to the connector within a plane that extends through a longitudinal axis of the connector.

* * * * *